US012599123B2

(12) United States Patent
Trentmann et al.

(10) Patent No.: US 12,599,123 B2
(45) Date of Patent: Apr. 14, 2026

(54) METHOD FOR SPREADING SPRAYING LIQUID ONTO ARABLE AGRICULTURAL LAND

(71) Applicant: Amazonen-Werke H. Dreyer SE & Co. KG, Hasbergen (DE)

(72) Inventors: Markus Trentmann, Wallenhorst (DE); Alexander Siltmann, Osnabrück (DE)

(73) Assignee: Amazonen-Werke H. Dreyer SE & Co. KG, Hasbergen (DE)

( * ) Notice: Subject to any disclaimer, the term of this patent is extended or adjusted under 35 U.S.C. 154(b) by 248 days.

(21) Appl. No.: 18/286,186

(22) PCT Filed: Mar. 25, 2022

(86) PCT No.: PCT/EP2022/057866
§ 371 (c)(1),
(2) Date: Oct. 9, 2023

(87) PCT Pub. No.: WO2022/214332
PCT Pub. Date: Oct. 13, 2022

(65) Prior Publication Data
US 2024/0196878 A1     Jun. 20, 2024

(30) Foreign Application Priority Data

Apr. 8, 2021     (DE) ..................... 10 2021 108 730.9

(51) Int. Cl.
*A01M 7/00*          (2006.01)
(52) U.S. Cl.
CPC ........ *A01M 7/0089* (2013.01); *A01M 7/0053* (2013.01)
(58) Field of Classification Search
CPC ... A01M 7/005; A01M 7/0053; A01M 7/0089
(Continued)

(56) References Cited

U.S. PATENT DOCUMENTS

| | | |
|---|---|---|
| 4,392,611 A | 7/1983 | Bachman et al. |
| 5,134,961 A | 8/1992 | Giles et al. |

(Continued)

FOREIGN PATENT DOCUMENTS

| | | |
|---|---|---|
| AU | 2017285727 B2 | 12/2018 |
| CN | 109725655 B | 1/2021 |

(Continued)

OTHER PUBLICATIONS

German Search Report for German Application No. DE 102021108730.9 dated Jan. 17, 2022 (includes English language translation).

(Continued)

*Primary Examiner* — Steven J Ganey
(74) *Attorney, Agent, or Firm* — Potomac Law Group, PLLC; John (Jack) Penny

(57) ABSTRACT

A method for spreading a spraying liquid onto arable agricultural land by way of several switching elements arranged on an agricultural sprayer and controllable in an open-loop and/or closed-loop manner and in the manner of a pulse width modulation, where the spraying liquid is spread as required onto the arable agricultural land; where a first opening duration associated with a first switching element and at least one further opening duration associated with a further switching element is determined; where spreading the spraying liquid is influenced at least in part by way of the respective opening duration; where at least one upper and/or lower limit opening duration associated with the switching elements is used; and where the first and further determined opening duration is compared with the upper and/or lower limit opening duration. In order to further improve in a simple manner, the spreading process of the spraying liquid, in particular to improve the achievable spreading precision and/or spreading quality, it is provided in the event of the upper limit opening duration being exceeded and/or the (Continued)

lower limit opening duration being undercut by one of the determined opening durations, that the first and further opening durations are accordingly jointly corrected.

17 Claims, 9 Drawing Sheets

(58) Field of Classification Search
USPC ........................................... 239/159–172, 69
See application file for complete search history.

(56) References Cited

U.S. PATENT DOCUMENTS

| | | | | |
|---|---|---|---|---|
| 8,523,085 | B2 * | 9/2013 | Grimm | A01M 7/0089 239/69 |
| 9,504,212 | B2 * | 11/2016 | Michael | A01G 25/16 |
| 10,427,179 | B2 * | 10/2019 | Posselius | B05B 12/1418 |
| 10,773,271 | B2 | 9/2020 | Funseth et al. | |
| 11,160,204 | B2 * | 11/2021 | Michael | A01C 23/042 |
| 2016/0175869 | A1 | 6/2016 | Sullivan et al. | |

FOREIGN PATENT DOCUMENTS

| | | | |
|---|---|---|---|
| DE | 102017114637 | A1 | 12/2018 |
| EP | 1346637 | A1 | 9/2003 |
| EP | 3603369 | A1 | 2/2020 |
| WO | 2020239771 | A1 | 12/2020 |

OTHER PUBLICATIONS

International Search Report for International Application No. PCT/EP2022/057866 dated Jul. 27, 2022 (includes English language translation).

German Search Report for International Application No. DE 102021108731.7 dated Jan. 21, 2022 (includes English language translation).

International Search Report for International Application No. PCT/EP2022/057864 dated Jul. 26, 2022 (includes English language translation).

Non-Final Office Action issued in U.S. Appl. No. 18/285,942 mailed on Aug. 5, 2025.

* cited by examiner

Ohne Korrektur (DC = 65%)

| Durchfluss Q [l/min] | 1,4 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,5 | 0,8 | 2,3 | 1,8 | 1,9 | 1,6 | 1,0 | 0,8 | 0,8 | 1,8 |
| DCV [%] | 68,2 | 36,4 | 104,5 | 81,8 | 86,4 | 72,7 | 45,5 | 36,4 | 36,4 | 81,8 |

Mit Korrektur (-4,5%)

| Durchfluss Q [l/min] | 1,4 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,5 | 0,8 | 2,3 | 1,8 | 1,9 | 1,6 | 1,0 | 0,8 | 0,8 | 1,8 |
| DCVK [%] | 65,2 | 34,8 | 100,0 | 78,2 | 82,6 | 69,6 | 43,5 | 34,8 | 34,8 | 78,2 |

DMAX

Fig.5a

Ohne Korrektur (DC = 65%)

| Durchfluss Q [l/min] | 1,3 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,5 | 0,8 | 1,8 | 1,8 | 1,9 | 1,6 | 1,0 | 0,6 | 0,8 | 1,8 |
| DCV [%] | 71,7 | 38,2 | 86,0 | 86,0 | 90,8 | 76,5 | 47,8 | 28,7 | 38,2 | 86,0 |

Mit Korrektur (+1,3%)

| Durchfluss Q [l/min] | 1,3 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,5 | 0,8 | 1,8 | 1,8 | 1,9 | 1,6 | 1,0 | 0,6 | 0,8 | 1,8 |
| DCVK [%] | 74,9 | 39,9 | 89,9 | 89,9 | 94,9 | 79,9 | 49,9 | 30,0 | 39,9 | 89,9 |

DMIN

Fig.5b

Ohne Korrektur (DC = 65%)

| Durchfluss Q [l/min] | 1,3 | | | | | | | | | |
| --- | --- | --- | --- | --- | --- | --- | --- | --- | --- | --- |
| | V1 | V2 | V3 | V4 | V5 | V6 | V7 | V8 | V9 | V10 |
| QV [l/min] | 1,5 | 0,8 | 2,2 | 1,8 | 1,9 | 1,6 | 1,0 | 0,5 | 0,8 | 1,8 |
| DCV [%] | 70,1 | 37,4 | 102,8 | 84,1 | 88,8 | 74,8 | 46,7 | 23,3 | 37,4 | 84,1 |

Mit Korrektur (- 2,9%) + Druckerhöhung

| Durchfluss Q [l/min] | 1,3 | | | | | | | | | |
| --- | --- | --- | --- | --- | --- | --- | --- | --- | --- | --- |
| | V1 | V2 | V3 | V4 | V5 | V6 | V7 | V8 | V9 | V10 |
| QV [l/min] | 1,5 | 0,8 | 2,2 | 1,8 | 1,9 | 1,6 | 1,0 | 0,5 | 0,8 | 1,8 |
| DCVK [%] | 68,1 | 36,3 | 100,0 | 81,8 | 86,3 | 72,7 | 45,4 | 30,0 | 36,3 | 81,8 |

DMAX

DMIN

Ohne Korrektur (DC = 65%)

| Durchfluss Q [l/min] | 1,3 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,5 | 0,8 | 2,2 | 1,8 | 1,9 | 1,6 | 1,0 | 0,5 | 0,8 | 1,8 |
| DCV [%] | 70,1 | 37,4 | 102,8 | 84,1 | 88,8 | 74,8 | 46,7 | 23,3 | 37,4 | 84,1 |

Mit Korrektur (+ 6,6% vom jeweiligen DCV) + Druckreduzierung

| Durchfluss Q [l/min] | 1,3 | | | | | | | | | |
|---|---|---|---|---|---|---|---|---|---|---|
| | V1 | V2 | V3 | V4 | V5 | V6 | V7 | V8 | V9 | V10 |
| QV [l/min] | 1,6 | 0,8 | 1,8 | 1,8 | 1,8 | 1,7 | 1,0 | 0,5 | 0,8 | 1,8 |
| DCVK [%] | 90,0 | 48,0 | 100,0 | 100,0 | 100,0 | 96,0 | 60,0 | 30,0 | 48,0 | 100,0 |

DMIN

DMAX

METHOD FOR SPREADING SPRAYING LIQUID ONTO ARABLE AGRICULTURAL LAND

CROSS REFERENCE TO RELATED APPLICATIONS

The present application claims priority under 35 U.S.C. § 365 to PCT/EP2022/057866 filed on Mar. 25, 2022 and under 35 U.S.C. § 119(a) to German Application No. 10 2021 108 730.9 filed on Apr. 8, 2021.

BACKGROUND

The disclosure relates to a method for spreading spraying liquid onto arable agricultural land and an agricultural sprayer.

A plurality of variants of towed, mounted, and/or self-propelled working machines is known in the field of agriculture. These include, inter alia, distribution machines configured as agricultural sprayers, in particular field sprayers, which are suitable for dispensing a spraying liquid onto arable agricultural land. The spraying liquid is generically configured as a weed control agent, plant protection agent, and/or fertilizer and is intended to be spread onto the arable agricultural land and/or its plant population.

Due to the relatively large dimensions of arable agricultural land, such agricultural sprayers typically have at least one distributor linkage extending transverse to a direction of travel and in particular being foldable. A plurality of spraying nozzles is arranged along the distributor linkage, by way of which the material is spread onto the arable agricultural land by way of associated switching elements, such as solenoid valves. Furthermore, at least one, in particular central, delivery unit is arranged upstream of the switching elements and is configured to supply the spraying liquid to the switching elements, starting out from the at least one storage container with an adjustable through-flow, in particular an adjustable flow quantity and/or an adjustable flow pressure. Furthermore, the output, in particular a current output quantity and/or an output pressure, of the spraying liquid is released at least in part by way of the respective switching elements as a function of the requirements and an associated adjustable opening duration associated with the respective switching elements.

A corresponding method and a corresponding sprayer for spreading spraying liquid onto arable agricultural land is described in EP 1 346 637 A1. It discloses switching elements which can be controlled in an open-loop and/or closed-loop manner and in the manner of pulse width modulation (PWM) and which are associated with individual and/or a plurality of spraying nozzles for outputting the spraying liquid as required. A first opening duration associated with a first switching element and at least one further opening duration associated with a further switching element are determined there, where the output of the spraying liquid by way of the spraying nozzles is influenced at least in part by the respective opening duration of the switching elements. Furthermore, at least one upper and/or lower limit opening duration associated with the switching elements is used and compared with the first and/or at least one further opening duration.

The problem with methods and/or sprayers configured in this way is that the adjustment or correction of the opening duration of the first switching element triggered when the limit opening duration is exceeded or undercut also affects the output, in particular the current output quantity and/or the output pressure, of the at least one further or other switching element. In particular, the interaction between the switching elements that arises and that is at least almost ignored has a particularly disadvantageous effect on the spreading accuracy and/or spreading quality that can be achieved by way of the sprayer.

SUMMARY

The object underlying the disclosure is therefore to create a method for spreading spraying liquid in such a way that the spreading of the spraying liquid, in particular the achievable spreading accuracy and/or spreading quality, is improved even further in a particularly simple manner. In particular, an interaction between several switching elements that influences the output is to be taken into account and/or compensated for at least in part.

This object is satisfied according to the disclosure in that, when the upper limit opening duration is exceeded and/or the lower limit opening duration is undercut by one of the first or further determined opening durations, the first and further opening duration are corrected accordingly jointly preferably by an increase and/or reduction, in order to maintain the output at least in part as required.

A first opening duration is preferably determined for a first switching element and a respective individual further opening duration for a plurality of further or other switching elements.

As a result of this measure, if the at least one first opening duration exceeds or undercuts at least temporarily the at least one limit opening duration, also at least one further opening duration, which does not exceed or undercut the respective limit opening duration, is nevertheless adjusted or corrected. Conversely, if at least one further opening duration exceeds or undercuts the limit opening duration, the at least one first opening duration which, however, does not exceed or undercut the respective limit opening duration, is also nevertheless adjusted or corrected. If at least one opening duration associated with at least one switching element exceeds or undercuts the limit opening duration, the opening durations of all switching elements are preferably adjusted or corrected. Furthermore, the output as required is preferably maintained in such a way that a current output quantity and/or a current output pressure by way of the at least one switching element, preferably across all switching elements, is maintained at least approximately with a corrected opening duration. With a method implemented in this manner, the spreading of the spraying liquid is improved in a particularly simple manner even in areas of the arable land where the requirements for spraying liquid are particularly demanding.

In the following, the term "opening duration" is to be understood to mean a time period or a time span within a switching period or a switching cycle during which the respective switching element is open at least in part. In other words, for this period of time or this time span, at least a partial quantity of the spraying liquid supplied is released by way of the respective switching element and therefore the associated spraying nozzle. Outside of this period of time or this time span, at least a partial quantity of the spraying liquid supplied is blocked at least in part by way of the respective switching element and therefore the associated spraying nozzle.

Furthermore, unless explicitly stated otherwise, the term "limit opening duration" hereafter refers to a maximum or minimum duration or period of time that the first or further opening duration may be at a maximum or minimum. If the respective opening duration, that is in particular ascertained, is shorter than the minimum limit opening duration, then the limit opening duration is undercut by the respective, in particular ascertained, opening duration. If the respective, in particular ascertained, opening duration is longer than the maximum limit opening duration, then the limit opening duration is exceeded by the respective, in particular ascertained, opening duration. In addition to a maximum limit opening duration, a minimum limit opening duration is preferably also used for at least one switching element, where a permissible range for the first and/or further opening duration is particularly preferably spanned by the maximum and minimum limit opening duration. In particular, range limits, that are preferably individually specific for a respective switching element, are defined for the respective opening duration by the limit opening duration and the associated permissible range.

The preferably maximum and/or minimum limit opening duration is preferably determined individually on the basis of the respective switching element and/or the associated spraying nozzle, which in particular, is in use. In addition, the preferably maximum and/or minimum limit opening duration is alternatively or additionally determined on the basis of the through-flow supplied by the delivery unit, in particular the predetermined flow quantity and/or the pre-determined flow pressure and/or the current speed of travel of the sprayer. In particular, the through-flow can be represented as an average value of the output, in particular of the required output quantities to be spread by way of the switching elements and/or spraying nozzles.

Ascertaining and/or determining the, in particular first and/or further, opening duration and/or the, in particular maximum and/or minimum, limit opening duration is particularly preferably performed again within each open-loop and/or closed-loop control cycle of an open-loop and/or closed-loop control system associated with the sprayer. The open-loop and/or closed-loop control system preferably comprises at least one computing unit arranged within the sprayer and/or a towing vehicle associated therewith, where alternatively or additionally at least one computing unit connected to the open-loop and/or closed-loop control system, in particular wirelessly and/or decentrally, is also conceivable.

In a preferred embodiment of the method according to the disclosure, a maximum or minimum opening duration or a, preferably maximum, difference between the limit opening duration and the at least one first and/or further opening duration is ascertained, where the limit opening duration is at least temporarily exceeded or undercut by the respective first and/or further opening duration. An open-loop and/or closed-loop control system associated with the sprayer preferably ascertains the maximum or minimum opening duration or the difference between the limit opening duration and the associated first or further opening duration which exceeds or undercuts the respective limit opening duration. Furthermore, the at least one first and further opening duration is preferably corrected as a function of the maximum or minimum opening duration ascertained or the, preferably maximum, difference. In this case, the opening duration of all switching elements is particularly preferably corrected on the basis of the maximum or minimum opening duration ascertained or the, in particular maximum, difference in the exceeding or undercutting opening duration.

In a further development of the method according to the disclosure, the opening duration associated with a respective switching element is formed from a percentaged duty cycle and the in particular upper and/or lower limit opening duration from a percentage, in particular upper and/or lower, limit duty cycle. Both the duty cycle as well as the limit duty cycle there represent a duty factor or a ratio of a pulse duration to a period duration. In other words, the duty cycle represents the width of a pulse or a pulse width within the switching period or the switching cycle, respectively. The longer the duty cycle there, the longer the opening duration of the switching element. The percentaged duty cycle and/or limit duty cycle is particularly preferably determined individually for the respective first and further or other switching element, where, for correcting the first and/or further opening duration, the respective duty cycle associated with the switching elements is preferably corrected as a function of the maximum or minimum opening duration ascertained or the, in particular maximum, difference. This embodiment allows the output to be controlled, in particular the respective different output quantities and/or output pressures, by way of the switching elements, which is adapted in particular to modern sprayers and is particularly simple.

In another further development of the method according to the disclosure, the spraying liquid is spread by way of the switching elements on the basis of a determined average opening duration, in particular an average duty cycle. Preferably, a through-flow that can be supplied via the delivery unit, in particular a flow quantity and/or a flow pressure, of the spraying liquid and an, in particular current, speed of travel of the sprayer along the arable land are retrieved and/or predetermined by the open-loop and/or closed-loop control system and/or an operator, where the average opening duration, in particular the average duty cycle, is ascertained and/or determined on the basis of the retrieved and/or predetermined flow quantity and the speed of travel. The average opening duration, in particular the average duty cycle, is preferably predetermined by the open-loop and/or closed-loop control system in such a way that the retrieved and/or predetermined through-flow, in particular the flow pressure within the sprayer, is at least approximately reached and/or maintained during the spreading process. Furthermore, the first and further opening duration, in particular the first and further duty cycle, are determined on the basis of the average opening duration, in particular the average duty cycle. When the first or further opening duration, in particular the first or further duty cycle, is corrected, the average opening duration, in particular determined and/or predetermined by the open-loop and/or closed-loop control system, in particular the average duty cycle, is adjusted. In such an embodiment, the output, in particular the adjustment of the first and/or further opening duration, is achieved in a particularly resource-saving manner, in particular with a low computing requirement and/or determination effort.

When correcting the first or further opening duration, in particular the first or further duty cycle, the average opening duration, in particular the average duty cycle, is particularly preferably adjusted in such a way that the through-flow, in particular the flow quantity and/or the flow pressure, is at least almost unaffected by the correction.

In a further preferred embodiment of the method according to the disclosure, at least one, preferably common, correction factor is ascertained for the first and further determined opening duration as a function of the maximum or minimum opening duration or the, preferably maximum, difference. For correcting the first and further opening duration, the at least one correction factor is offset against the average opening duration, in particular the average duty cycle. This embodiment allows for even more simplified determination of the respective opening durations, in particular the duty cycles, for the switching elements.

In a further development of the method according to the disclosure, at least one required output quantity associated with at least one respective switching element, in particular a spraying nozzle, is determined, where, for correcting the first and further opening duration, the at least one correction factor is offset against the respective required output quantity of a switching element. The respective required output quantity of the switching elements is preferably based on a demand for spraying liquid that is specific to a partial area of the arable agricultural land and/or the plant population. In a particularly preferred manner, the output quantity respectively required is determined on the basis of a retrievable and/or predeterminable application map. Furthermore, the correction factor is preferably offset against the respective required output quantity of a switching element and against the average opening duration, in particular the average duty cycle, that is determined and/or predetermined, in particular by the open-loop and/or closed-loop control system. With such an embodiment of the method, determining the respective output quantities and/or output pressures that can be set by way of the switching elements is achieved, firstly, in a demand-oriented and, secondly, in a simple manner.

In a particularly preferred embodiment of the method according to the disclosure, the switching elements can also be controlled in an open-loop and/or closed-loop manner and in the manner of pulse width frequency modulation (PWFM), where the at least one upper and/or lower limit opening duration is determined, preferably variably, as a function of at least one pulse frequency associated with the respective switching elements. Unlike with pure pulse width modulation (PWM), the pulse frequency or the duration of the switching cycle of the switching element can also be changed there as an alternative or in addition to the opening duration or the pulse width, respectively. The opening limit duration, in particular the limit duty cycle, of a switching element is particularly preferably determined and/or predetermined as a function of the respective pulse frequency associated with the switching element. For example, the limit opening duration, in particular the minimum limit duty cycle, of at least one switching element can there be reduced by an at least temporary reduction in the pulse frequency. Conversely, for example, the limit opening duration, in particular the minimum limit duty cycle, of at least one switching element can also be increased by an at least temporary increase in the pulse frequency. By way of such an embodiment, a range of uses and/or an employability of the actuating elements is increased to a particularly high extent. The at least one limit opening duration used, in particular the limit duty cycle, is thus now adjustable with particularly high variability during the spreading process instead of the at least approximately fixed specification previously known from prior art.

In a particularly preferred further development of the method according to the disclosure, it is verified whether a required output, in particular a required output quantity and/or a required output pressure, is obtained by way of the respective switching elements and/or the associated spraying nozzles with the at least one determined upper and/or lower limit opening duration, in particular the limit duty cycle. If the required output, in particular the required output quantity and/or the required output pressure, is outside a preferably predeterminable acceptance range, then the at least one upper and/or lower limit opening duration, in particular the limit duty cycle, is corrected by adjusting the pulse frequency associated with the respective switching elements.

In addition, the spraying liquid to be spread is preferably supplied to the respective switching elements with a determined, preferably retrievable and/or predeterminable through-flow, in particular a flow quantity and/or a flow pressure.

In a particularly preferred embodiment of the method according to the disclosure, the through-flow, in particular the flow quantity and/or the flow pressure within the sprayer, is increased accordingly by exceeding the upper limit opening duration or reduced accordingly by undercutting the lower limit opening duration. The through-flow, in particular the flow quantity and/or the flow pressure, is preferably adjusted at least temporarily when the limit opening duration is exceeded or undercut, in particular when the limit opening duration, which is adjustable by way of the pulse frequency, is not reached by the, preferably first and/or further, opening duration. In such an embodiment, the at least one, in particular upper and/or lower, limit opening duration of at least one switching element can be adjusted dynamically and/or temporarily, in particular in dependence of the situation, during the spreading process.

In a further particularly preferred development of the method according to the disclosure, a permissible speed of travel, preferably a permissible speed range of travel, for the sprayer during the spreading process is ascertained based on the at least one, preferably upper and/or lower, limit opening duration, the, in particular selected, spraying nozzles, and/or the respective output quantities. The permissible speed of travel, in particular the permissible speed range of travel, is preferably ascertained and/or retrieved in an automated manner by way of the open-loop and/or closed-loop control system. The operator preferably receives a visualization and/or alarm if the permissible speed of travel, preferably the speed range of travel, is exceeded or undercut.

In a particularly preferred embodiment, the permissible speed of travel, preferably the permissible speed range of travel, is adjusted by changing the at least one upper and/or lower limit opening duration, in particular the pulse frequency.

The object underlying the disclosure is also satisfied by an agricultural sprayer with an open-loop and/or closed-loop control system of the kind mentioned at the outset, where the agricultural sprayer is configured, in particular by way of the open-loop and/or closed-loop control system, to carry out at least in part the method according to at least one aforementioned embodiment. With regard to the advantages and modifications of the agricultural sprayer according to the disclosure, reference is first made to the advantages and modifications of the method according to the disclosure.

BRIEF DESCRIPTION OF THE DRAWINGS

Further details of the disclosure can be gathered from the description of the examples and the drawings. where the drawing in FIG. 1 shows an embodiment of an agricultural sprayer according to the disclosure in a schematic view from behind;

FIG. 5*a* shows a first embodiment of controlling switching elements with a correction according to the disclosure in a schematic view;

FIG. 5*b* shows a second embodiment of controlling switching elements with a correction according to the disclosure in a schematic view;

DETAILED DESCRIPTION

Figure 1:
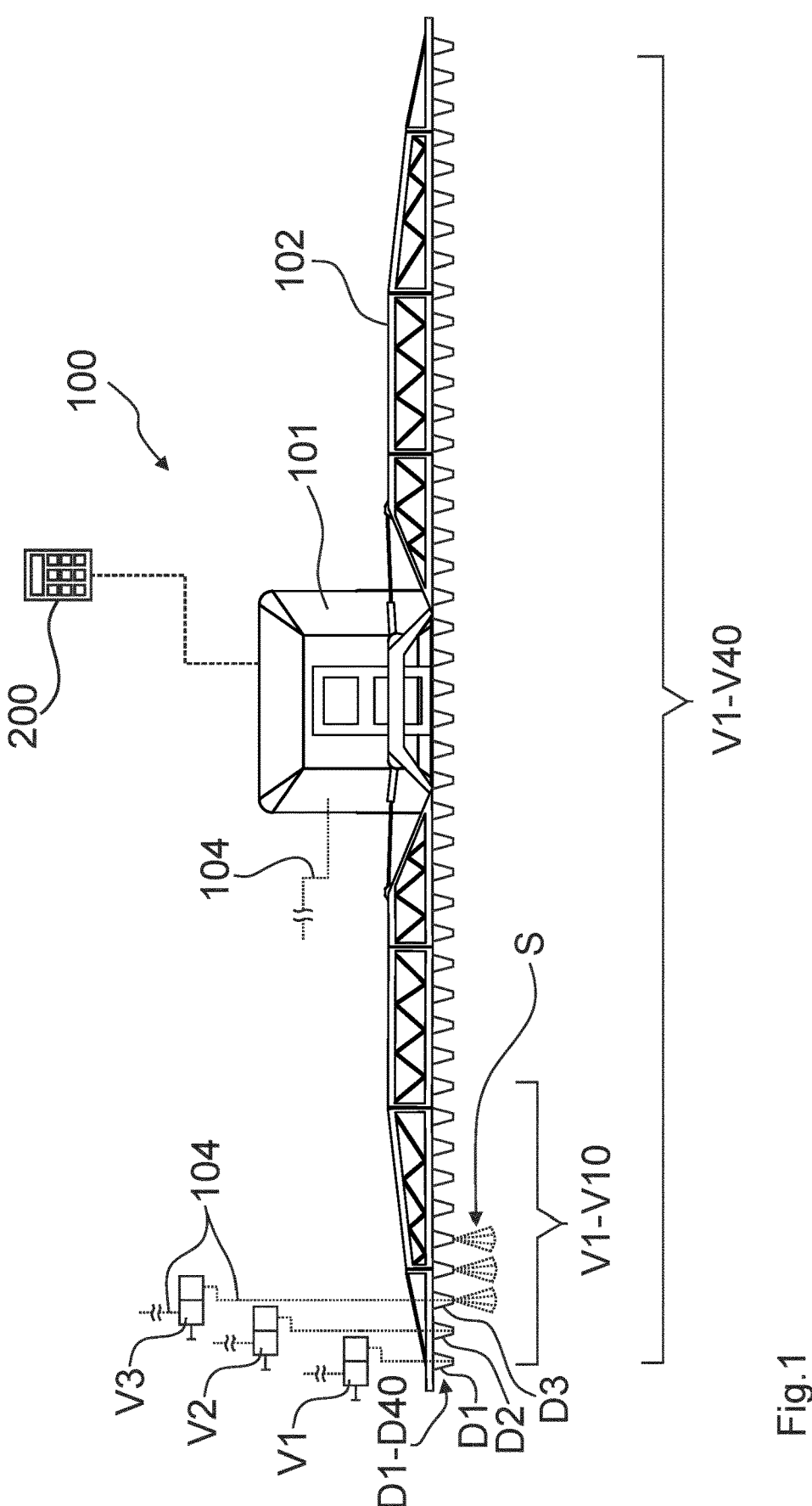

An agricultural sprayer 100 carried by a towing vehicle, in particular a tractor (not shown), with an open-loop and/or closed-loop control system 200 associated therewith is shown in FIG. 1. As an alternative to the embodiment shown, sprayer 100 can also be configured as a towed and/or self-propelled sprayer, in particular as a field sprayer.

Sprayer 100 is configured to spread spraying liquid S, in particular in the form of weed control agents, plant protection agents and/or fertilizer, onto arable agricultural land and/or onto a plant population by way of several spraying nozzles D1-D40 arranged on a foldable distributor linkage 102. Sprayer 100 shown by way of example comprises, in addition to a storage container 101 which is used to store the spraying liquid S, a delivery system (not shown in the figures) with at least one delivery unit, in particular a delivery pump, and several fluid-conducting delivery lines 104. The delivery system, in particular the at least one delivery unit, is configured to deliver spraying liquid S with an adjustable through-flow Q, in particular flow pressure and/or adjustable flow quantity, via fluid lines 104 from storage container 101 to spraying nozzles D1-D40 arranged along distributor linkage 102. Each spraying nozzle D1-D40 is associated with at least one switching element V1-V40 that can be controlled in an open-loop and/or closed-loop manner and in the manner of a pulse width modulation (PWM) and is configured as a solenoid valve, where switching elements V1-V40 are arranged between respective spraying nozzles D1-D40 and storage container 101. Only switching elements V1-V3 associated with spraying nozzles D1-D3 and fluid lines 104 associated therewith are shown schematically in FIG. 1 for reasons of clarity. Respective switching elements V1-V40 are configured to release spraying liquid S which can be delivered by way of the delivery unit to respectively associated spraying nozzles D1-D40 as required. In particular, spraying liquid S is released by switching elements V1-V40 in such a way that an output quantity of spraying liquid S required for at least a partial area of the arable land is applied onto the arable land and/or plant population by way of spraying nozzles D1-D40. Alternatively or in addition to the output quantity, an output pressure at which spraying liquid S exits from respective spraying nozzles D1-D40 can also be varied by way of switching elements V1-V40. Depending on the embodiment of spraying nozzles D1-D40 and/or through-flow Q, in particular the flow quantity and/or the flow pressure, within sprayer 100, spraying liquid S can be output in the form of a spray fan S emanating from spraying nozzles D1-D40, in particular with an adjustable droplet spectrum.

Alternatively or additionally, switching elements V1-V40 can also be arranged within and/or on respective spraying nozzles D1-D40. Furthermore, spraying nozzles D1-D40 can also alternatively or additionally be part of a multiple nozzle body with several spraying nozzles D1-D40 that can be activated for spreading, where each multiple nozzle body and/or a respective group of spraying nozzles D1-D40 can be associated with at least one switching element V1-V40. At this point, it is to be explicitly pointed out that the number of switching elements V1-V40 and/or spraying nozzles D1-D40 is presently fixed to be 40 only by way of example. Generic sprayers 100 can also comprise fewer or more than 40 switching elements V1-V40 and/or spraying nozzles D1-D40.

The output, in particular the through-flow Q, the output quantity and/or the output pressure, by way of spraying nozzles D1-D40 can be influenced by an opening duration DCV associated with respective switching elements V1-V40. For outputting as required, open-loop and/or closed-loop control system 200 determines at least one first opening duration DCV associated with a first switching element V1 and at least one further opening duration DCV associated with a further or another switching element V2-V40. Furthermore, open-loop and/or closed-loop control system 200 uses at least one upper and/or lower limit opening duration GU1-GO2 associated with respective switching elements V1-V40, where at least one first and/or further determined opening duration DCV is compared by open-loop and/or closed-loop control system 200 with respective upper and/or lower limit opening duration GU1-GO2. When upper limit opening duration GO1, GO2 is exceeded and/or lower limit opening duration is GU1, GU2 undercut by one of first or further determined opening durations DCV, open-loop and/or closed-loop control system 200 is additionally configured to jointly correct first and further opening duration DCV accordingly, in particular by an increase and/or reduction, and to thereby maintain at least in part the output as required, in particular specific to a partial area.

In this embodiment, the opening duration associated with a respective switching element V1-V40 is formed from a percentaged duty cycle DCV. Analogously, the, in particular upper and/or lower, limit opening duration is formed from an, in particular upper and/or lower, limit duty cycle GU1-GO2.

Figure 2A:
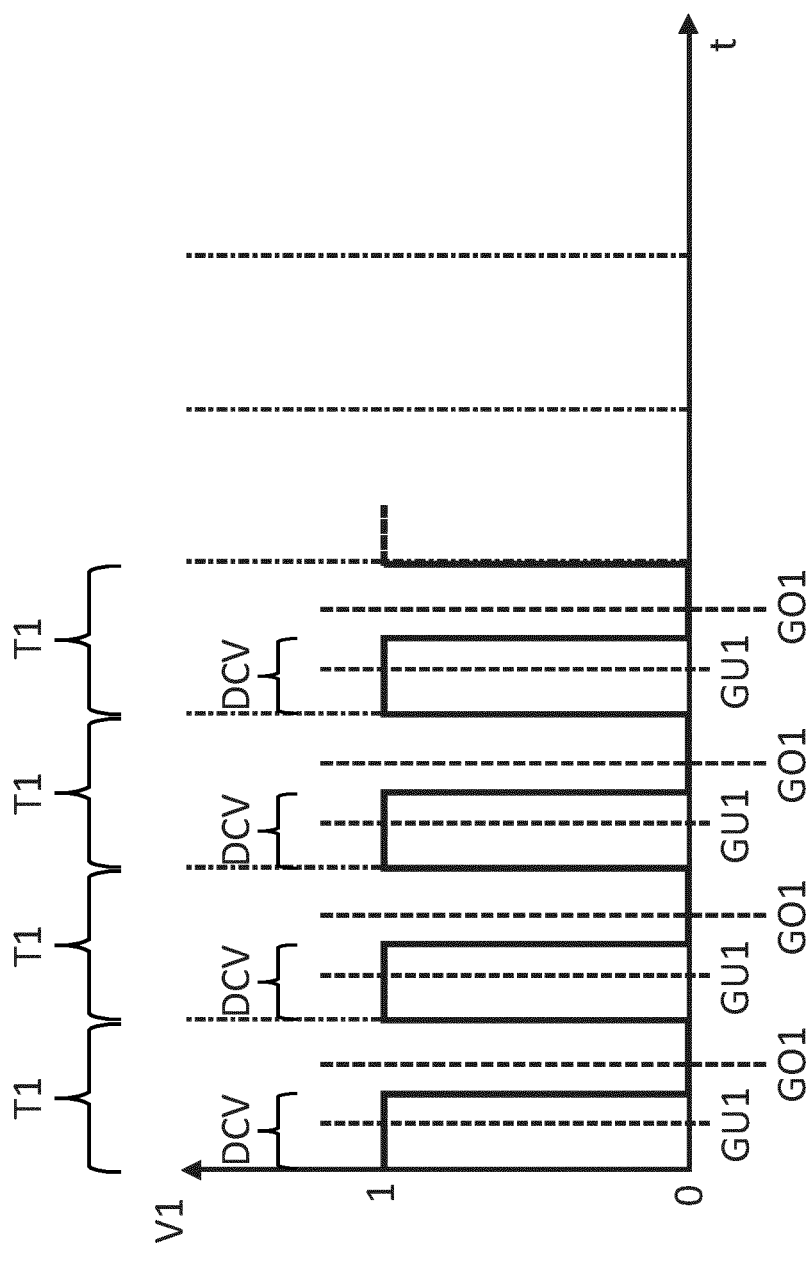
FIG. 2a shows a first switching sequence of a switching element in a schematic view.
Figure 2B:
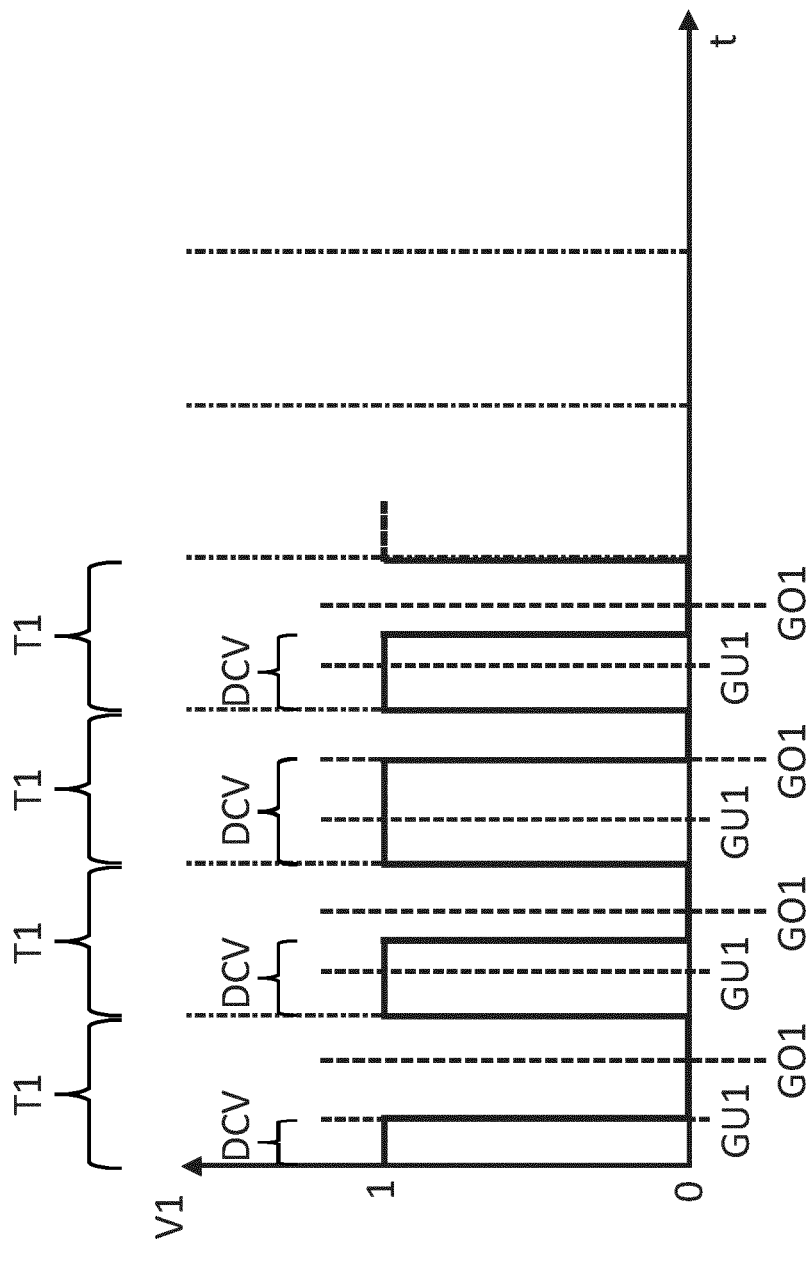
FIG. 2b shows the switching sequence from FIG. 2a with variation of an opening duration.

Switching elements V1-V40 can be suitably controlled as shown by way of example in FIGS. 2*a* and 2*b* and described in more detail hereafter. Switching element V1, presently considered by way of example for the description, can be moved within a first period duration T1 to switching position 0 (closed valve position) to block the delivery and to switching position 1 (open valve position) to release the delivery. For this purpose, switching element V1 is actuated with an adjustable electrical current, in particular with a modulated electrical voltage and/or amperage. In the embodiment shown in FIG. 2*a*, first period duration T1 is constant and is composed of the opening duration or duty cycle DCV, respectively, and the duration in the closed switching position 0. The width of the respective pulses shown within a period duration T1 therefore corresponds to duty cycle DCV of switching element V1, where the width of duty cycle DCV is constant in this embodiment, in particular approximately 50% of period duration T1. Duty cycle DCV of switching element V1 can be varied by open-loop and/or closed-loop control system 200 within the respective switching period or the pulse frequency between lower limit duty cycle GU1 (presently by way of example approximately 30%) and upper limit duty cycle GO1 (presently by way of example approximately 70%) in order to influence the output at least in part. In other words, permissible range limits are formed between upper limit duty cycle GO1 and lower limit duty cycle GU1 for duty cycle DCV of switching element V1.

An exemplary permissible variation of duty cycle DCV can be seen in FIG. 2b. Duty cycle DCV of switching element V1 in the first switching period or pulse frequency, respectively, is set at least almost to lower limit duty cycle GU1. In the third switching period, duty cycle DCV is adjusted at switching element V1 to at least almost upper limit duty cycle GO1 to change the output. In this case, the longer the duty cycle DCV, the more spraying liquid S is output by way of switching element V1-V40 and thus associated spraying nozzle D1-D40.

Figure 3:
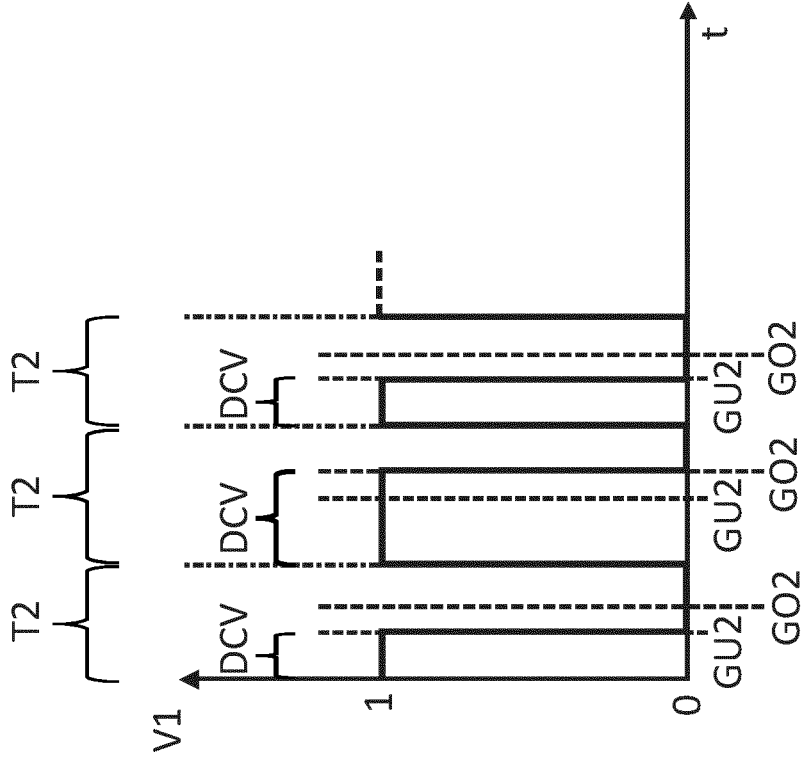
FIG. 3 shows a second switching sequence with variation of a pulse frequency and a limit opening duration in a schematic view.

Alternatively or additionally, switching elements V1-V40 can be controlled in an open-loop and/or closed-loop manner, in particular by open-loop and/or closed-loop control system 200, and in the manner of a pulse width frequency modulation. As a result, in addition to switching period T1, T2, in particular upper and/or lower limit opening duration GU1-GO2, in particular the limit duty cycle, can also be adjusted, as can be seen in FIG. 3. Second period duration T2 or switching period shown is reduced compared to the previous embodiment. Analogously, in particular upper and/or lower limit duty cycle GU2, GO2 is also adjusted. The upper and/or lower limit opening duration or limit duty cycle GU1-GO2, respectively, can therefore be adjusted and/or determined in particular variably, as a function of the adjustable pulse frequency.

According to the disclosure, the control or method principle described with reference to FIGS. 2a, 2b and Figure can likewise be applied to further or other switching elements V2-V40.

Figure 4:
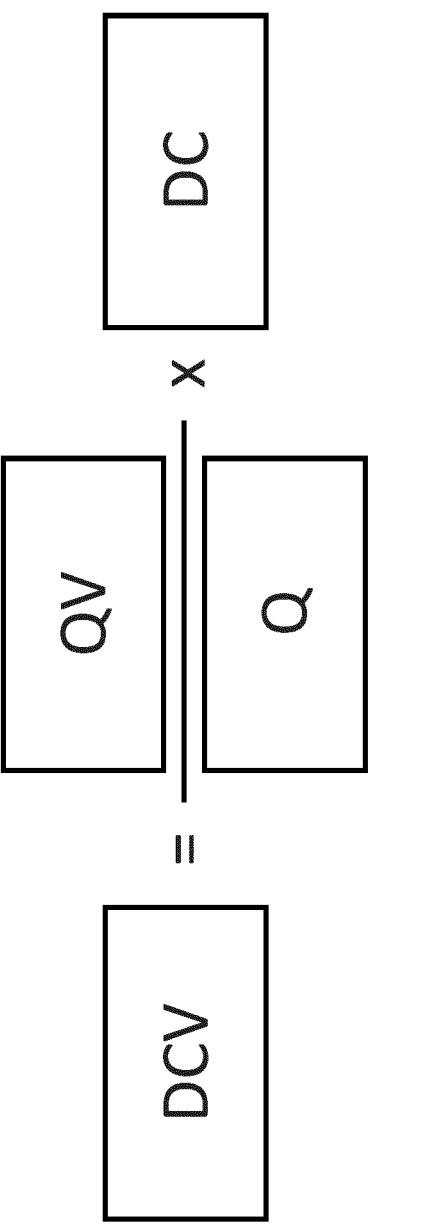
FIG. 4 shows an embodiment of an equation for ascertaining and/or calculating an opening duration of the switching element.

Furthermore, respective duty cycle DCV of switching elements V1-V40 can be determined, for example, according to the equation shown in FIG. 4. Duty cycle DCV is there determined and/or ascertained on the basis of a determined and/or predetermined average opening duration or an average duty cycle DC, respectively. To determine average duty cycle DC, required through-flow Q, in particular the flow quantity and/or the flow pressure, the output quantity onto at least one partial area, a speed of travel of sprayer 100 and/or the spraying nozzle D1-D40, that is in particular employed, are predetermined to open-loop and/or closed-loop control system 200. These values can be predetermined at least in part by an operator and/or alternatively or additionally can be retrieved and/or determined by open-loop and/or closed-loop control system 200. In particular, required through-flow Q, in particular flow quantity and/or the flow pressure, is set during the spreading process by open-loop and/or closed-loop control system 200 by varying average duty cycle DC. Furthermore, due to the different requirements that are specific to partial areas of the arable land for spraying liquid S, in particular different, required output quantities QV are predetermined for associated with switching elements V1-V40 The required output quantities QV, in particular related to one switching element V1-V40, are retrieved and/or determined by open-loop and/or closed-loop control system 200, where output quantities QV are also predeterminable manually by an operator as an alternative or in addition. The opening duration or duty cycle DCV of a respective switching element V1-V40 is consequently based, in particular according to the equation shown in FIG. 4, at least on average duty cycle DC, through-flow Q, and required output quantity QV.

Figure 5C:
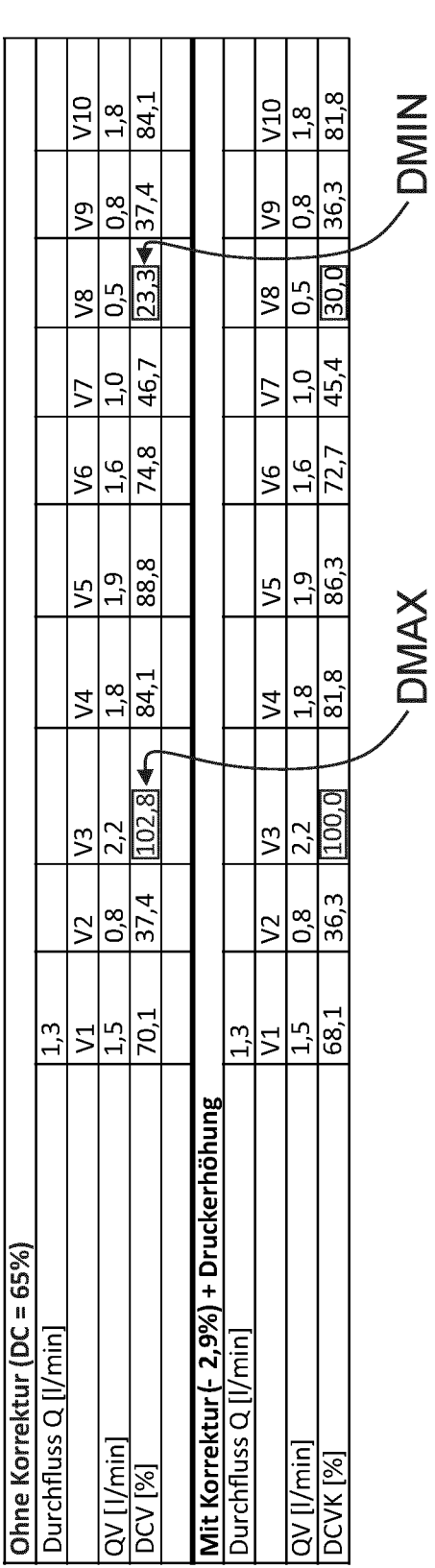
FIG. 5*c* shows a third embodiment of controlling switching elements with a correction according to the disclosure in a schematic view.

If opening durations or duty cycle DCV arise during the spreading process or the operation that exceed or undercut the respectively associated limit opening durations or limit duty cycle GU1-GO2, then duty cycle DCV of switching elements V1-V40 are corrected according to the disclosure and as described hereafter by way of example with reference to FIGS. 5a to 5c. For the sake of clarity, the embodiments shown in FIGS. 5a-5b shall be explained in more detail, viewed from the left, using first ten switching elements V1-V10 and spraying nozzles D1-D10, where remaining switching elements V11-V40 in particular are to be treated analogously. In the exemplary scenarios shown, the upper limit opening duration or upper limit duty cycle GO1, GO2 is predetermined as 100% and the lower limit opening duration or lower limit duty cycle GU1, GU2 as 30%. Furthermore, based on the demand for spraying liquid S by the arable land, an average opening duration or an average duty cycle DC of at least approximately 65% is predetermined and/or set. The at least one delivery unit, in particular a delivery pump, adjusts a through-flow Q, in particular a flow quantity embodied as a through-flow, of spraying liquid S within fluid lines 104. In particular, through-flow Q there represents an average value of output quantities QV to be output by way of control elements V1-V10, in particular spraying nozzles D1-D10.

FIG. 5a shows an exemplary scenario in which a through-flow Q, in particular an average flow quantity, of approximately 1.43 l/min is demanded, predetermined, and/or set. On this basis and in accordance with the equation described above, in particular individual duty cycle DCV listed in the columns of the upper half of the table and associated with respective switching elements V1-V10 result. Since duty cycle DCV of 104.5% associated with switching element V3 there exceeds upper limit duty cycle GO1, GO2, this one and the other duty cycles, in particular all duty cycles DCV associated with respective switching elements V1-V10, are corrected accordingly, in particular by a reduction.

Open-loop and/or closed-loop control system 200 there ascertains a maximum opening duration or a maximum duty cycle DMAX from the first and further opening duration or first and further duty cycle DCV which exceeds the upper limit opening duration or the upper limit duty cycle GO1, GO2, respectively In particular, a maximum difference between upper limit duty cycle GO1, GO2 and the maximum first and/or further duty cycle DCV exceeding upper limit duty cycle GO1, GO2 is ascertained, where the maximum difference there is approximately 4.5%. In the following, duty cycles DCV, in particular all first and further ones, associated with switching elements V1-V10 are corrected as a function of ascertained maximum duty cycle DMAX, in particular the maximum difference from upper limit duty cycle GO1, GO2, as can be seen in the lower half of the table shown in FIG. 5a. Appropriately corrected duty cycles DCVK which are associated with respective switching elements V1-V10, are therefore ascertained and/or determined by open-loop and/or closed-loop control system 200 in particular for at least substantially maintaining or upholding through-flow Q and/or required output quantities QV.

The average opening duration or average duty cycle DC determined in the previous step, in particular by open-loop and/or closed-loop control system 200, is furthermore adjusted by a correction of the first and further opening duration carried out in accordance with FIG. 5a. In particular, the adjusted average opening duration or average duty cycle DC is there formed from an average value of the corrected opening durations or duty cycles DCVK.

A scenario is shown in FIG. 5b in which a through-flow Q, in particular an average flow quantity, is demanded, predetermined and/or set at around 1.36 l/min and lower limit duty cycle GU1, GU2 is there undercut. A minimum opening duration or a minimum duty cycle DMIN is there ascertained by open-loop and/or closed-loop control system 200 from the first and further opening duration or first and further duty cycle DCV which undercuts the lower limit opening duration or lower limit duty cycle GU1, GU2, respectively. In particular, a maximum difference between lower limit duty cycle GU1, GU2 and minimum first and/or further duty cycle DCV, which undercuts lower limit duty cycle GU1, GU2, is ascertained.

Minimum duty cycle DMIN is there duty cycle DCV of actuating element V8 and, according to the equation from FIG. 4, is approximately 28.7%. This corresponds in particular to a maximum difference of approximately 1.3% from lower limit duty cycle GU1, GU2. Thereafter, duty cycle DCV associated with switching elements V1-V10, in particular all first and further ones, are corrected as a function of ascertained minimum duty cycle DMIN, in particular the minimum difference from lower limit duty cycle GU1, GU2, as can be seen in the lower half of the table shown in FIG. 5a. Duty cycle DCVK correspondingly corrected by open-loop and/or closed-loop control system 200 is thus ascertained and/or determined and associated with respective switching elements V1-V10, in particular for at least substantially maintaining or upholding through-flow Q and/or output quantities QV. In particular, with this control process, previously ascertained and/or determined duty cycles DCV are jointly corrected in particular by an increase, to corrected duty cycle DCVK.

In particular, the average opening duration or average duty cycle DC, respectively, is adjusted accordingly by the correction to the corrected opening duration or duty cycle DCVK, respectively, as already described in the previous example with reference to FIG. 5a.

As an alternative or in addition to, in particular prior to, the correction described in FIG. 5b, open-loop and/or closed-loop control system 200 can verify whether lower Limit duty cycle GU1, GU2 can be adapted to the minimum duty cycle DMIN by pulse width frequency modulation (PWFM), in particular by a reduction of the respective pulse frequencies of switching elements V1-V10, in particular when the output remains almost the same and/or within an acceptance range. In particular, this embodiment verifies whether at least one lower limit duty cycle GU1, GU2 of switching element V8 can be adjusted to minimum duty cycle DMIN. As an alternative or in addition thereto, for adjusting required output quantity QV and associated opening duration or duty cycle DCV, the speed of travel of sprayer 100 can furthermore also be reduced, in particular at least temporarily, to such an extent that the lower limit opening duration, in particular lower limit duty cycle GU1, GU2, is not undercut by minimum duty cycle DMIN.

To correct the first and/or further opening duration or first and/or further duty cycle DCV, at least one, in particular common, correction factor is ascertained by open-loop and/or closed-loop control system 200 as a function of the maximum or minimum opening duration or maximum or minimum duty cycle DMAX, DMIN, in particular the maximum difference. In particular, the correction factor comprises the maximum or minimum opening duration or maximum or minimum duty cycle DMAX, DMIN, respectively. Alternatively or additionally, the correction factor can there also comprise the upper and/or lower limit opening duration or upper and/or lower limit duty cycle GU1-GO2, respectively. Furthermore, in a further alternative embodiment, the correction factor can be formed at least in part from the, in particular maximum, difference between maximum or minimum duty cycle DMAX, DMIN and upper and/or lower limit duty cycle GU1-GO2. The at least one, in particular common, correction factor is offset against the average opening duration or average duty cycle DC and/or the output quantity QV respectively associated with switching elements V1-V10 for correcting the first and/or further duty cycle DCV.

FIG. 5c shows an exemplary scenario in which a through-flow Q, in particular an average flow quantity, is demanded, predetermined and/or set at approximately 1.39 l/min and upper limit duty cycle GO1, GO2 is exceeded and lower limit duty cycle GU1, GU2 is undercut. Duty cycle DCV of switching element V3 ascertained according to the original equation is approximately 102.9% and thereby exceeds defined upper limit duty cycle GO1, GO2, in particular by a difference of approximately 2.9%. Duty cycle DCV of switching element V8 ascertained according to the original equation is approximately 23.4% and thereby undercuts defined lower limit duty cycle GU1, GU2, in particular by a difference of approximately 6.6%. Within such a scenario, the associated duty cycles DCV of all switching elements V1-V10, with the exception of switching elements V1-V10 which undercut lower limit duty cycle GU1, GU2, are corrected according to the scenario described in FIG. 5a in which upper limit duty cycle GO1, GO2 is exceeded. In particular, duty cycles DCV of all switching elements V1-V10, with the exception of switching element V8, are corrected by a reduction of determined duty cycles DCV to corrected duty cycle DCVK. Correspondingly, duty cycle DCV of switching element V3 is reduced to a corrected duty cycle DCVK by approximately 2.9% to 100%, in particular to upper limit duty cycle GO1, GO2. In addition, duty cycles DCV of switching elements V1, V2, V4-V7, V9, V10 are reduced by approximately 2.9% of respective duty cycle DCV and are thereby adjusted to respective corrected duty cycles DCVK. The duty cycle DCV of switching element V8 is adjusted to lower limit duty cycle GU1, GU2. On average, in particular across all switching elements V1-V10, this results in a reduction in duty cycles DCV whereby this is accompanied by and/or accepts an increase in the flow pressure in the overall system or the delivery system, respectively.

As an alternative or in addition to this scenario, it is verified whether an adjustment, in particular by pulse width frequency modulation, of lower limit duty cycle GU1, GU2 of at least one switching element V8 to ascertained minimum duty cycle DMIN is permissible and/or achievable. Alternatively or additionally, it can be verified beforehand whether an adjustment of lower limit duty cycle GU1, GU2 to ascertained minimum duty cycle DMIN is permissible and/or achievable by way of an adjustment, in particular a reduction, of the speed of travel of sprayer 100. In particular, an ascertained corrected speed of travel can be proposed to the operator and/or to open-loop and/or closed-loop control system 200, by way of which lower limit duty cycle GU1, GU2 can be adjusted to ascertained minimum duty cycle DMIN, where the operator manually and/or open-loop and/or closed-loop control system 200 in an automated manner can take over the corrected speed of travel on the basis of decision-making and/or calculation operations.

Figure 5D:
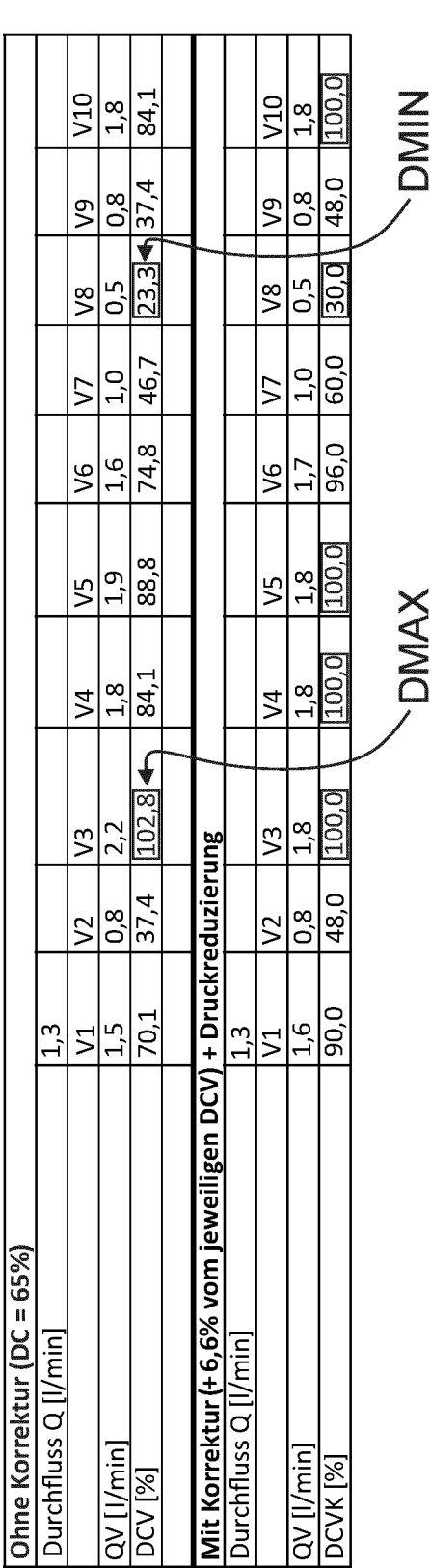
FIG. 5*d* shows a fourth embodiment of controlling switching elements with a correction according to the disclosure in a schematic view.

An alternative and/or additional scenario to that shown in FIG. 5c, in particular an alternative correction, is shown in FIG. 5d. The initial conditions, in particular the values present before the correction, such as through-flow Q, limit duty cycles GU1-GO2, ascertained duty cycles DCV, as well as associated output quantity QV, correspond to the values from FIG. 5c. In this scenario, the associated duty cycles DCV of all switching elements V1-V10, with the exception of switching elements V1-V10 which exceed upper limit duty cycle GO1, GO2, are corrected according to the scenario described in FIG. 5b in which lower limit duty cycle GU1, GU2 is undercut. In particular, duty cycles DCV of all switching elements V1-V10, with the exception of switching elements V3-V5 and V10, are there corrected by an increase of determined duty cycles DCV to corrected duty cycles DCVK. Correspondingly, duty cycle DCV of switching element V8 is increased to a corrected duty cycle DCVK by approximately 6.6% to 30%, in particular to lower limit duty cycle GU1, GU2. In addition, duty cycles DCV of switching elements V1, V2, V6, V7, V9 are increased by approximately 6.6% of respective duty cycle DCV and are thereby adjusted to respective corrected duty cycles DCVK. Duty cycle DCV of switching elements V3-V5 and V10 are adjusted to upper limit duty cycle GO1, GO2. On average, in particular across all switching elements V1-V10, this results in an increase in duty cycles DCV where this is accompanied by or accepts a reduction in the flow pressure in the overall system or the delivery system, respectively.

In addition, in the control processes and/or methods described, a permissible speed of travel, in particular a permissible speed range of travel, can be ascertained alternatively or in additionally during the spreading process for sprayer 100. The permissible speed of travel, in particular the speed range of travel, is ascertained based on at least one, in particular upper and/or lower limit opening duration GU1-GO2, in particular on selected spraying nozzles D1-D40, and/or on respective required output quantities QV. In particular a speed of travel profile that can be retrieved by open-loop and/or closed-loop control system 200 and/or a maximum permissible speed of travel for the arable land to be treated and/or configuration of sprayer 100 can alternatively or additionally be ascertained and/or determined. Furthermore, exceeding or undercutting the, in particular maximum, permissible speed of travel, in particular the speed range of travel, is alternatively or additionally visualized to the operator by the current speed of travel of sprayer 100. A visual and/or acoustic alarm is also conceivable there. Furthermore, automated adjustment of the current speed of travel to the permissible speed of travel, in particular by open-loop and/or closed-loop control system 200, is alternatively or in additionally also conceivable.

Furthermore, the permissible speed of travel, in particular the speed range of travel, can alternatively or additionally be adjusted at least temporarily by changing, in particular upper and/or lower, limit duty cycles GU1-GO2. Limit duty cycles GU1-GO2 can be changed in particular by the adjustment of the pulse frequency associated with switching elements V1-V40.

Furthermore, as an alternative or in addition to the control processes and/or methods described, it is conceivable that a previously defined and/or predetermined control strategy can be selected, by way of which it can be predetermined for open-loop and/or closed-loop control system 200 which of the scenarios or corrections described in FIGS. 5a-5d are implemented when limit duty cycles GU1-GO2 is exceeded or undercut. In particular, at least one of several control strategies can be selected prior to the spreading process and determine the type of correction to be performed in the event of limit duty cycle GU1-GO2 being exceeded and undercut, in particular simultaneously, according to the scenarios from FIG. 5c or FIG. 5d, in particular whether an increase or a reduction in the flow pressure is accepted and/or predetermined.

It goes without saying that the features mentioned in the embodiments described above are not restricted to these special combinations and are also possible in any other combination. Furthermore, it goes without saying that the numerical values described in the embodiments are only by way of example and can be adapted randomly as required.

LIST OF REFERENCE CHARACTERS

100 sprayer
101 storage container
102 distributor linkage
104 delivery lines
200 open-loop and/or closed-loop control system
D1-D40 spraying nozzles
DC average duty cycle
DCV opening duration, duty cycle of the switching elements
DCVK corrected opening duration, corrected duty cycle
DMAX maximum limit opening duration, maximum duty cycle
DMIN minimum limit opening duration, minimum duty cycle
GU1, GU2 lower limit opening duration, lower limit duty cycle
GO1, GO2 upper limit opening duration, upper limit duty cycle
Q through-flow
QV output quantity by way of switching elements
S spraying liquid
T1 first period duration
T2 second period duration
V1-V40 switching elements

The invention claimed is:

1. A method for spreading a spraying liquid onto arable agricultural land by way of several switching elements arranged on an agricultural sprayer and controllable in an open-loop and/or closed-loop manner and in the manner of a pulse width modulation, where said spraying liquid is spread onto the arable agricultural land by way of spraying nozzles associated with said respective switching elements, comprising:

determining a first opening duration associated with a first switching element and at least one further opening duration associated with a further switching element;

wherein the spreading process of said spraying liquid is influenced at least in part by said respective opening duration, using at least one upper and/or lower limit opening duration associated with said switching elements; and comparing said first and further determined opening duration with said upper and/or lower limit opening duration;

wherein, when said upper limit opening duration is exceeded and/or said lower limit opening duration is undercut by one of said first or further determined opening durations, said first and further opening duration are corrected accordingly jointly in order to maintain the spreading process at least in part as required.

2. The method according to claim 1, further comprising:

ascertaining a maximum or minimum opening duration or a difference between said limit opening duration and said at least one first and/or further opening duration which exceeds said upper limit opening duration or undercuts said lower limit opening duration; and correcting said at least one first and further opening duration as a function of said ascertained maximum or minimum opening duration or said difference.

3. The method according to claim 2, wherein said difference between said limit opening duration and said at least one first and/or further opening duration is a maximum difference between said limit opening duration and said at least one first and/or further opening duration.

4. The method according to claim 1, wherein said opening duration associated with a respective switching element is formed from a percentaged duty cycle and said upper and/or lower limit opening duration from a percentaged upper and/or lower, limit duty cycle.

5. The method according to claim 4, wherein said spraying liquid is spread on the basis of a determined average opening duration by way of said switching elements, wherein said first and further opening duration is determined on the basis of said average opening duration, and where said average opening duration, is adjusted.

6. The method according to claim 5, further comprising: ascertaining at least one correction factor for said first and further determined opening duration as a function of said maximum or minimum opening duration or said maximum, difference; wherein, for correcting said first and further opening duration, said at least one correction factor is offset against said average opening duration.

7. The method according to claim 5, wherein said average opening duration is adjusted by correcting said first or further opening duration.

8. The method according to claim 6, further comprising: determining at least one output quantity which is associated with at least one respective switching element, and is dependent on said respective opening duration; wherein, for correcting said first and further opening duration, said at least one correction factor is offset against said respective spreading quantity.

9. The method according to claim 6, wherein said correction factor is a common correction factor for said first and further determined opening duration.

10. The method according to claim 1, with at least one first switching element and a plurality of further switching elements, wherein a first duty cycle is determined for said first switching element and a respective individual further opening duration for said plurality of further switching elements, wherein when said upper limit opening duration is exceeded and/or said lower limit opening duration is undercut, said first and said plurality of further opening durations are corrected.

11. The method according to claim 1, wherein said switching elements can be controlled in an open-loop and/or closed-loop manner and in the manner of a pulse width frequency modulation, wherein said at least one upper and/or lower limit opening duration (GU1-GO2) is determined variably as a function of at least one pulse frequency associated with said respective switching elements.

12. The method according to claim 11, further comprising:

verifying whether the required output of said spraying liquid with said respective switching elements is achieved with said at least one determined upper and/or lower limit opening duration; and correcting said at least one upper and/or lower limit opening duration by adjusting the pulse frequency associated with a respective switching element.

13. The method according to claim 1, where said spraying liquid is supplied to said switching elements with a defined flow pressure, wherein the flow pressure is increased accordingly when said upper limit opening duration is exceeded or is reduced accordingly when said lower limit opening duration is undercut.

14. The method according to claim 1, further comprising:

ascertaining a permissible speed of travel for said sprayer during the spreading process based on said at least one limit opening duration, said spraying nozzles, and/or said respective output quantities; and/or visualizing and/or outputting an alarm to the operator if a permissible speed of travel is exceeded or undercut, respectively; and/or adjusting a permissible speed of travel.

15. The method according to claim 14, wherein the permissible speed of travel is adjusted by changing said at least one upper and/or lower limit opening duration.

16. An agricultural sprayer with at least one associated open-loop and/or closed-loop control system for controlling said sprayer in an open-loop and/or closed-loop manner, wherein said agricultural sprayer is configured by way of said open-loop and/or closed-loop control system to carry out at least in part the method according to claim 1.

17. The method according to claim 1, wherein said first and further opening duration are corrected accordingly jointly by an increase and/or reduction.

* * * * *